United States Patent [19]

Córdova

[11] Patent Number: 4,574,842

[45] Date of Patent: Mar. 11, 1986

[54] WATER DISTRIBUTION VALVE

[76] Inventor: Adolfo O. Córdova, Avda. R.S. Pena 943, Buenos Aires, Argentina, 1035

[21] Appl. No.: 544,409

[22] Filed: Oct. 20, 1983

[51] Int. Cl.$^4$ .................. F16K 11/07; F16K 11/00
[52] U.S. Cl. .................. 137/625.46; 137/625.14; 137/625.15
[58] Field of Search .............. 137/625.46, 625.47, 137/597, 625.14, 625.15, 625.16; 251/297

[56] References Cited

U.S. PATENT DOCUMENTS 1,333,048  3/1920  Webster ................. 251/297
1,886,889  11/1932  Krupp .................. 137/625.47

FOREIGN PATENT DOCUMENTS 868746  1/1942  France ................. 137/625.47

Primary Examiner—Martin P. Schwadron
Assistant Examiner—John S. Starsiak, Jr.
Attorney, Agent, or Firm—Wenderoth, Lind & Ponack

[57] ABSTRACT

A water distribution valve including a cylindrical outer box having hot and cold water inlet ports and a plurality of outlet ports in the cylindrical outer wall thereof, and a cylindrical inner cup which is rotatable within the box with the cylindrical walls thereof in sliding contact with the cylindrical walls of the box. Inlet and outlet holes are provided in the cylindrical outer walls of the cup, which holes are respectively alignable with the ports in the box to allow hot and/or cold water to flow into the cup through one or two aligned inlet ports and holes and then out through an aligned outlet hole and port. The holes and ports are arranged so that incremental rotations of the cup in the box aligns different cup holes and box ports to selectively provide hot, cold or warm water to any one of the outlet ports.

12 Claims, 6 Drawing Figures

FIG. 5.
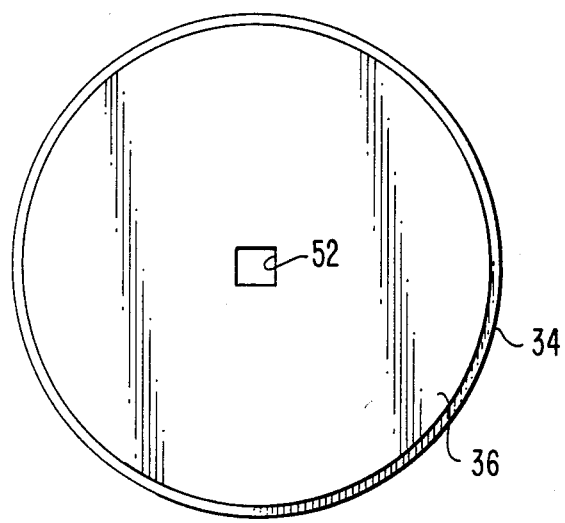
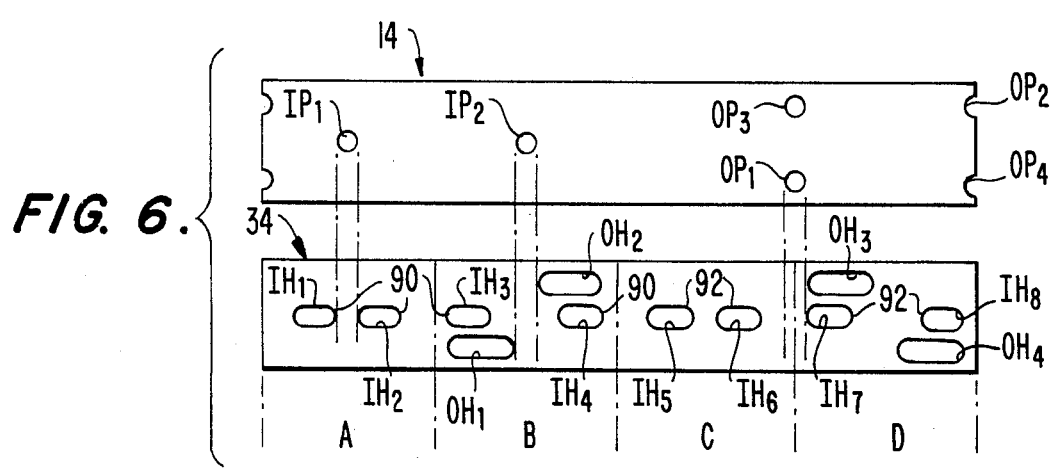
FIG. 6.

WATER DISTRIBUTION VALVE

BACKGROUND OF THE INVENTION

1. Field of the Invention

The present invention relates to a rotary valve and more particularly to a rotary valve for distributing hot, cold or warm water to any one of several sanitary elements.

2. Prior Art

In a conventional bathroom or kitchen, separate taps and valves control the distributions of hot, cold and warm water to the individual water outlets. For example, the washbasin, shower, bathtub, and bidet in a bathroom each have their own tap.

Prior rotary valves are not suitable for distributing hot, cold or warm water to any one of several outlets.

U.S. Pat. No. 3,124,162 issued to Cameron on Mar. 10, 1964, U.S. Pat. No. 1,026,608, issued to W. Schorn on May 14, 1912, and U.S. Pat. No. 4,310,026, issued to Cohen on Jan. 12, 1982, disclose rotary disk valves provided with one inlet and multiple outlets which permit water or other liquids to be distributed to a number of locations, but none of the disclosed systems permit the mixing of two input liquids so as to alternatively allow hot, cold, or warm water to be distributed.

U.S. Pat. No. 4,161,191 issued to Ranger et al. on July 17, 1979 discloses a rotary disk valve device which may be rotated in order to continuously adjust the opening ratio between the various output openings which may be directed from a liquid faucet to auxiliary devices, but no provision is made for mixing two input liquids.

U.S. Pat. No. 4,330,008, issued to Skelly on May 18, 1982 discloses a valve having multiple stacked disk valves for adding and subtracting from a liquid rate therethrough. U.S. Pat. No. 4,286,624, issued to Clausen et al. on Sept. 1, 1981 also discloses stacked disk valves having cylindrical wall openings for distributing liquids from a plurality of sources to a plurality of engines. However, neither system provides for optional mixing of two input fluids before distributing them.

U.S. Pat. No. 2,581,878 issued to E. Pick on Jan. 8, 1952 discloses a multiple port disk valve which, however, does not provide for mixing of input liquids. Similarly, U.S. Pat. No. 2,765,810, issued to F. H. Bergquist on Oct. 9, 1956, discloses a gas valve for distributing gas to a double gas burner, which is not designed for mixing input fluids before distribution.

U.S. Pat. No. 1,538,787, issued to O. L. Fillmore on May 19, 1925, discloses a disk valve arrangement for a gasoline supply station, wherein gasoline and air may be provided through inlet ports in the valve. This valve cannot distribute either or both of two fluids to a plurality of output ports.

U.S. Pat. No. 3,040,777, issued to D. B. Carson et al. on June 26, 1962, discloses a rotary valve of the disk type which permits the interconnection of two independent sets of conduits such that each conduit of the first set comes into individual communication with every conduit of the second set according to a pre-determined sequence upon traversal of all adjusted positions of the valve. The valve does not provide for the selected mixture of the source fluids.

OBJECTS OF THE INVENTION

It is an object of the present invention to provide a water distributor valve which selectively channels hot, cold or warm water into any one of several, for example, four output pipes, which may, for example, be connected to a wash basin, a shower, a bathtub and a bidet.

It is another object of the present invention to provide a single rotary valve which can selectively distribute hot, cold or warm water in a bathroom to a shower, a wash basin, a bathtub or a bidet by simply rotating the valve to a corresponding position.

BRIEF SUMMARY OF THE INVENTION

In order to meet these objects, the present invention provides a water distribution valve which includes a cylindrical outer box having hot and cold water inlet ports and a plurality of outlet ports in the cylindrical outer wall thereof, and a cylindrical inner cup which is rotatable within the box, with cylindrical outer walls in sliding relation to the cylindrical walls of the box. Inlet and outlet holes are provided in the cylindrical outer walls of the cup which are respectively alignable with the ports in the box to allow hot and/or cold water to flow into the cup through aligned one or two inlet ports and holes, and then out through an aligned outlet hole and port. The holes and ports are arranged so that incremental rotations of the cup in the box aligns different cup holes and box ports to selectively provide hot, cold or warm water to any one of the outlet ports.

In accordance with another aspect of the invention, a handle provided with a detent mechanism permits the cup to be easily rotated and held at a selected angular position.

BRIEF DESCRIPTION OF THE DRAWINGS

These and other aspects of the invention will be better understood from the following detailed description of a preferred embodiment, when taken with the attached drawings in which:

FIG. 5 is a bottom view of the cup of the invention; and

FIG. 6 is an explanatory view of the internal cylindrical surfaces of the box and cup of the present invention stretched out along a horizontal plane.

DETAILED DESCRIPTION OF A PREFERRED EMBODIMENT

Figure 1:
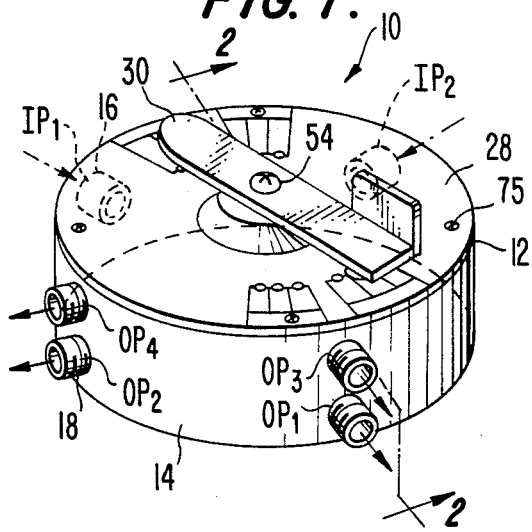
FIG. 1 is a prospective view of the water distribution valve in accordance with the present invention.

Referring first to FIG. 1, the water distribution valve 10 has a cylindrical housing or "box" 12 having a cylindrical side wall 14 in which a pair of inlet ports 16, including cold water inlet port $IP_1$ and hot water inlet port $IP_2$, are formed. Also formed in the cylindrical wall 14 are four outlet ports 18 including outlet ports $OP_1$, $OP_2$, $OP_3$ and $OP_4$. Outlet ports $OP_1$ and $OP_3$ are vertically aligned and outlet ports $OP_2$ and $OP_4$ are also vertically aligned. Outlet ports $OP_2$ and $OP_3$ are located at an upper level, while outlet ports $OP_1$ and $OP_4$ are located at a lower level. Inlet ports 16 are located at a level intermediate between the upper and lower levels of outlet ports 18. Each of the inlet ports 16 and outlet ports 18 is provided with cylindrical externally threaded outwardly extending port members for connection to inlet and outlet water pipes.

Figure 2:
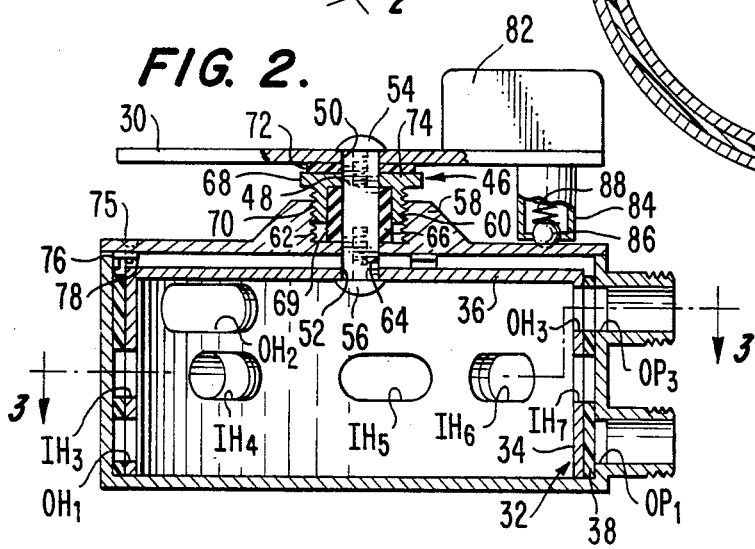
FIG. 2 is a sectional view taken along lines 2—2 of FIG. 1.

A disk-shaped cover plate 28 covers the upper opening in the cylindrical box 12. As is illustrated in FIGS. 1 and 2, the cover plate 28 is fastened to the box 12 by screws 75 which extend through holes in the plate to engage holes 76 in brackets 78 provided along the top edge of box 12. A handle 30 is pivotally mounted through the center of the plate to a cylindrical cup 32 within the box 12 as will be described below with reference to FIGS. 2 and 3.

Figure 3:
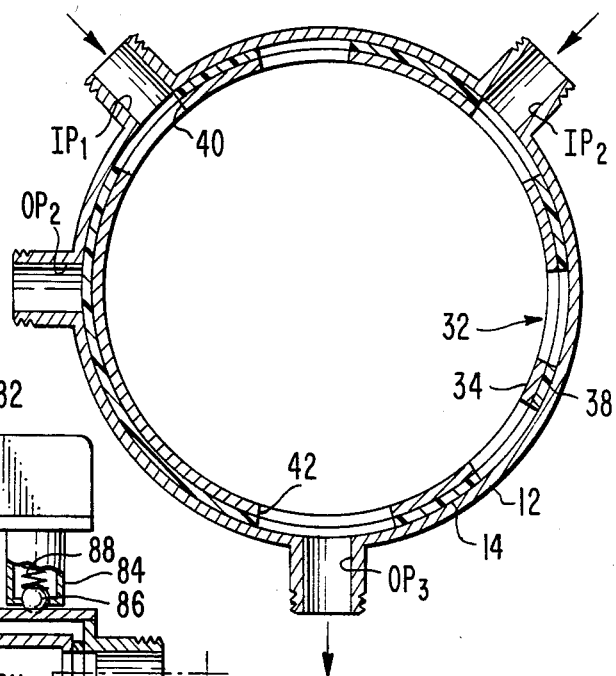
FIG. 3 is a sectional view of the invention taken along lines 3—3 of FIG. 2.

Referring to FIGS. 2 and 3, cup 32 is rotatably mounted within the box 12 and includes a cylindrical side wall 34 and an upper disk portion 36. The outside surface of the cylindrical wall 34 is provided with a layer 38 of suitable material such as rubber composite to permit easy sliding engagement between the cylindrical walls of the cup 32 and the cylindrical walls of the box 12, while preventing liquid from within the cup to leak between the respective cylindrical walls.

The cup 34 is provided with eight circumferentially elongated input holes 40 and four circumferentially elongated outlet holes 42. As will be described in greater detail below, the eight inlet holes 40 are circumferentially spaced at an intermediate vertical level so as to be alignable one or two at a time with the respective inlet ports $IP_1$ and $IP_2$. Two each of the four outlet holes 42 are provided at vertical levels respectively above and below the inlet ports 40 as to be alignable one at a time with corresponding ones of the outlet ports 18 as the cup is rotated within the box to successive orientations, as will be described in greater detail below. As will also be described in greater detail below, the respective ports and holes in the side walls of the box 12 and cup 32 are arranged so that rotation of the cup aligns the holes and ports so as to permit one or both of hot water and cold water to respectively enter the interior of cup 32 through one or two aligned inlet ports and holes, and to exit cup 32 through an aligned outlet hole and outlet port to the sanitary fixture to which the port is connected.

The outlet ports 18 and inlet ports 16 are suitable arranged with outlet ports $OP_2$ and $OP_4$ angularly spaced by 90 degrees from outlet ports $OP_1$ and $OP_3$, with inlet port $IP_1$ arranged 45 degrees from outlet ports $OP_2$ and $OP_4$ in the opposite angular sense from outlet ports $OP_1$ and $OP_3$, and with inlet port $IP_2$ spaced 90 degrees from inlet port $IP_1$, as is clearly shown in FIG. 3.

Referring to FIGS. 2 and 5, the cup 32 is rotated within box 12 by handle 30 which is connected to the cup by a cup handle connection 46. Cup handle connection 46 includes a generally cylindrical pin 48 having a square inner end, which extends at opposite ends through a hole 50 in handle 30 and a square central hole 52 in the disk shaped upper wall 36 of cup 32. Pin 48 is fixed to the handle 30 and disk-shaped upper wall 36 by screws 54 and 56, respectively. Cover plate 28 is centrally provided with a raised portion 58 having a centrally located vertical hole 60 whose upper portion 62 is internally threaded and whose lower portion 64 is not threaded and has a diameter corresponding to that of pin 48. The central portion of of pin 48 extends entirely through hole 60 and is surrounded in engaging relation by a gasket 66 whose internal diameter is equal to that of the pin 48 and whose outer diameter is less than that of the upper portion 62 of hole 60. A plug 68, pi-shaped in cross section and having an internal cylindrical cavity 69, surrounds the upper and side surfaces of the gasket 66 and has outer threads 70 for engaging the internal threads of the upper portion 62 of hole 60. A washer 72 is sandwiched between the upper portion 74 of plug 68 and the portion of the handle 30 surrounding the hole 50 therein.

With this arrangement, the gasket 66 and plug 68 prevent leakage of water from within cup 32 at the connection 46 while tightly connecting the handle 30 to the upper disk-shaped portion of cup 32 to permit the cup to be smoothly turned within the box 12 as the handle 30 is pivoted.

Figure 4:
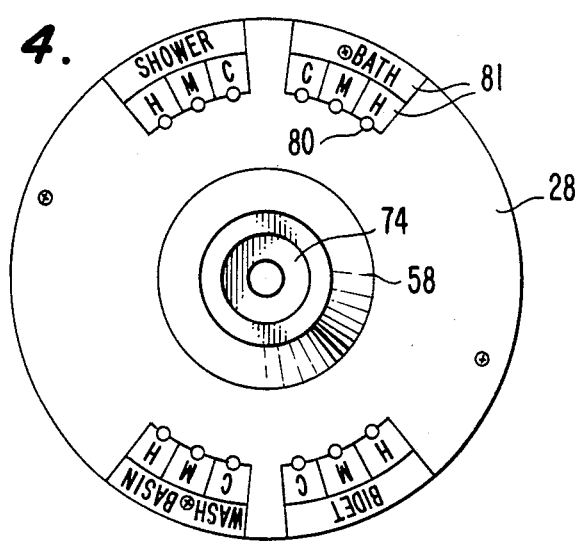
FIG. 4 is a plane view of the upper plate in accordance with the present invention.

Referring to FIGS. 2 and 4, the cover plate 28 is provided with a number of detents 80 corresponding to different angular orientations of the cup 32 within the box 12. Adjacent each detent 80 is corresponding indicia 81 of the fixture and the water temperature to be used. The handle 30 is provided with a gripping portion 82 at one end thereof. Below the gripping portion 82 is a downwardly extending cylinder 84 provided therein with a ball 86 downwardly biased by a spring 88. The ball 86 is sized so as to seat in the detent 80 in cover plate 28 to hold the handle 30 and cup 32 in a location corresponding to the fixture and water temperature desired to be in use.

The arrangement of the cup holes 40 and 42 and the box ports 16 and 18 may be selected according to the number and locations of sanitary fixtures to be served and other design criteria. In the exemplary embodiment illustrated herein, and which is best illustrated with reference to FIG. 6 the eight inlet holes 40 are arranged in two identical sets 90 and 92 of four holes on opposite hemispherical sides of the cylindrical wall 34 of the cup 32. Each of the eight holes 40 has a circumferential width equal to twice that of the inlet ports 16, the length of the diameter of the inlet ports for convenience hereinafter being referred to as a "unit".

As is illustrated in FIG. 6 the inlet holes 40 are arranged to each in each of four successive quadrants A, B, C, and D, each eight units wide measured in the circumferential direction. In quadrant A, inlet holes $IH_1$ and $IH_2$ are symmetrically located spaced apart by one unit. In quadrant B, inlet holes $IH_3$ and $IH_4$ are symmetrically located three units apart. Quadrants C and D respectively have inlet holes $IH_5$ and $IH_6$, and $IH_7$ and $IH_8$, respectively spaced as the inlet holes in quadrants A and B.

The four outlet holes 42, which are 3 units wide measured in the circumfertial direction, are located two each in quadrants B and D. Outlet holes $OH_1$ and $OH_2$ are respectively located below and above inlet holes $IH_3$ and $IH_4$ spaced circumferentially from each other one unit apart. On the other hand, in quadrant D, outlet holes $OH_3$ and $OH_4$ are located respectively above and below inlet holes $IH_7$ and $IH_8$ circumferentially spaced from each other by one unit. Thus, it can be seen that the inlet hole arrangement in quadrants A and B are respectively identical to those in quadrants C and D while the outlet hole arrangement in quadrant D is opposite that in quadrant B.

As can be seen from FIG. 6 the cup 32 can be rotated into a position wherein inlet port $IP_1$ is located between inlet holes $IH_1$ and $IH_2$, and inlet port $IP_2$ is located centrally between inlet holes $IH_3$ and $IH_4$. It can be seen that since the holes 40 in quadrants C and D are identical in spacing to those in quadrants A and B. If cup 12 is rotated 180 degrees, inlet port $IP_1$ will be located between input holes $IH_5$ and $IH_6$, and inlet port $IP_2$ will be located halfway between inlet holes $IH_7$ and $IH_8$.

In the respective orientations of the cup 32 and box 12 shown in FIG. 6, outlet ports $OP_3$ and $OP_4$ are respectively located immediately to the left and right of outlet holes $OH_3$ and $OH_4$. Thus, it can be seen that rotation of the cup 32 one unit to the right aligns inlet port $IP_1$ with inlet hole $IH_1$, and aligns outlet port $OP_4$ with outlet hole $OH_4$. Thus, with cold water being connected to inlet port $IP_1$, cold water will be directed through the valve 10 to outlet port $OP_4$. Rotation of cup 32 an additional unit to the right aligns inlet port $IP_2$ with inlet hole $IH_3$ while maintaining alignment of inlet port $IP_1$ and inlet hole $IH_1$ and alignment of outlet port $OP_4$ and outlet hole $OH_4$. With this orientation of the cup 32 and box 12, cold water and hot water respectively flow into the valve through inlet ports $IP_1$ and $IP_2$ respectively and out outlet port $OP_4$. If the cup 32 is rotated a third unit to the right, inlet port $IP_1$ is no longer aligned with an inlet hole, while inlet port $IP_2$ continues to be aligned with inlet hole $IH_3$ and outlet port $OP_4$ continues to be aligned with outlet hole $OH_4$. Thus, in this orientation of the cup 32 and box 12, only hot water flows through the valve and out outlet port $OP_4$.

If the cup 32 is rotated to the left from the orientation as shown in FIG. 6 it can be seen from the symmetry of the arrangement that rotation by 1, 2 and 3 units aligns first inlet port $IP_1$ and then inlet port $IP_2$ with the respective inlet holes $IH_2$ and $IH_4$ while maintaining alignment between outlet port $OP_3$ and outlet hole $OH_3$ so that cold, mixed, and hot water are provided through outlet port $OP_3$.

If the cup 32 is rotated 180 degrees from that shown in FIG. 6 it can be seen by the symmetry of the arrangement of holes that rotation therefrom of the cup 32 by 1, 2 and 3 units to the left or right respectively provides cold, mixed and hot water through outlet ports $OP_2$ and $OP_1$.

The placement of the various holes and ports may be modified in accordance with the invention. For example, the inlet and or outlet holes and ports may be located on the rear disk-shaped walls of the cup and box at different radii from the axis of rotation. The positions of the outlet holes 42 and the outlet ports 18 may be established substantially independently of the positions of the inlet holes 40 and inlet ports 16. It is necessary only that the positions of the individual outlet ports $OP_1$, $OP_2$, $OP_3$, and $OP_4$ be coordinated with the positions of the respective outlet holes $OH_1$, $OH_2$, $OH_3$ and $OH_4$.

The number of output ports may also be varied in accordance with the present invention. For example, if only three outlet ports are needed, outlet port $OP_4$, and the corresponding outlet hole $OH_4$, as well as the corresponding inlet holes $IH_1$ and $IH_3$ can be eliminated.

On the other hand, additional output ports can be provided in accordance with the present invention. For example, if eight outlet ports are desired, the height and diameter of the cup and box may be increased to provide eight quadrants of four inlet holes in the cup each quadrant arranged as in any one of quadrants A–D of the above embodiment. In accordance with such an alternative embodiment, the outlet holes and outlet ports would be arranged in four rather than two vertical levels, two each above and below the levels of the inlet ports and holes. In this manner, by turning the cup to the left or to the right from each of four equally spaced locations about the rotational axis of the valve, cold mixed and hot water can be directed to each of eight outlet ports and the sanitary fixtures which they serve.

It will be appreciated by those of ordinary skill in the art to which the invention pertains that although only one embodiment of the invention has been described and illustrated in detail, there are many modifications which can be made fully within the scope of the invention, which is limited only by the appended claims.

What is claimed is:

1. A rotary valve comprising:
    a box having a cylindrical box wall, defining a first internal space therein, having a longitudinal axis and a plurality of ports in said box wall peripherally of said longitudinal axis opening into said space, said plurality of ports including first and second inlet ports and n outlet ports, n being an integer greater than 1; and
    a cup having a cylindrical cup wall, mounted in said first internal space in said box for rotation about said longitudinal axis such that said cup wall rotates in sliding contact with said box wall;
    said cup wall defining therein a second internal space within said first internal space, and having a plurality of holes opening into said second internal space, said plurality of holes including 2n inlet holes forming n pairs of first and second inlet holes, one pair for and associated with each outlet port, and n outlet holes, one outlet hole for and associated with each outlet port, said plurality of holes and said plurality of ports being located and shaped such that there are n sets of angularly spaced first, second and third successive angular positions of said cup about said axis relative to said box, one set for and associated with each outlet port, and for any one of said outlet ports successive rotation of said cup to the first, second and third successive angular positions of the associated set:
        radially aligns in turn said first inlet port with the first inlet hole of the associated pair, said first and second of said inlet ports respectively with the first and second inlet holes of said associated pair, and said second inlet port with the second inlet hole of said associated pair, and
        concurrently and continuously during the rotation from said first angular position to said third angular position radially aligns the associated outlet hole with said any one of said outlet ports;
    whereby any one of a first fluid directed to said first inlet port, a second fluid directed to said second inlet port and both the first fluid and the second fluid respectively concurrently directed to said first inlet port and said second inlet port are directed into said second interior space and out any one of said outlet ports by rotating said cup to a corresponding one of said angular positions, and no drop in total cross-sectional area of overlap of said any one of said outlet ports and the associated pair of outlet holes occurs during said rotation between said first and said third angular positions of the associated set.

2. A rotary valve as in claim 1, wherein n equals 4, said n output ports comprising first, second, third and fourth outlet ports, said n outlet holes comprising first, second, third and fourth outlet holes.

3. A rotary valve as in claim 2, wherein said, first inlet port, said second inlet port, said first and second outlet ports, and said third and fourth outlet ports are respectively located at mutually spaced first, second, third and fourth angular locations about said axis.

4. A rotary valve as in claim 3, wherein said first and second outlet ports are axially spaced from each other and from said first and second inlet ports, said third and fourth outlet ports being axially spaced from each other and from said first and second inlet ports.

5. A rotary valve as in claim 4, wherein said first, second, third and fourth outlet holes, have widths in the circumferential direction respectively three times those of said first, second, third, and fourth outlet ports respectively aligned with said first, second, third and fourth outlet ports at corresponding first, second, third and fourth angular locations of said cup; said n pairs of inlet holes consisting of first, second, third and fourth pairs of inlet holes respectively corresponding to said first, second and third and fourth outlet holes, each pair consisting of first and second inlet holes having widths in the circumferential direction respectively twice those of said first and second inlet ports, said first and second inlet holes of said first, second, third and fourth pairs being respectively alignable with one or both of said first and second inlet ports only when said cup is respectively oriented at said first, second, third and fourth angular locations.

6. A rotary valve as in claim 5, wherein said outlet holes and said inlet holes are separated by wall portions of said cup which are alignable with all of said input and output ports to block inflow or outflow of fluid therethrough.

7. A rotary valve as in claim 2, further comprising a disc-shaped cover covering said first space, peripherally mounted to said box wall, having a central hole around said axis, having detents therein defining said angular locations adjacent the periphery thereof, and a handle pivotally mounted to said cup through said central hole, said handle including a detent mechanism to releasable engaging said detents to releasably hold said handle and said cup at corresponding angular locations.

8. A rotating valve as in claim 7, wherein said cup includes an upper disc-shaped plate covering said second space, said handle including a pin fixed to said handle and said plate at opposite ends, extending through said opening and connecting said handle to said plate.

9. A valve as in claim 1, wherein said ports are round and said holes are circumferentially elongated.

10. A valve as in claim 9, wherein said holes are rounded on their circumferential ends.

11. A valve as in claim 2, wherein said ports are round and said holes are circumferentially elongated.

12. A valve as in claim 11, wherein said holes are rounded on their circumferential ends.

* * * * *